US011553040B2

(12) United States Patent
Takahashi et al.

(10) Patent No.: US 11,553,040 B2
(45) Date of Patent: Jan. 10, 2023

(54) RELAY APPARATUS AND RELAY METHOD

(71) Applicant: Hitachi, Ltd., Tokyo (JP)

(72) Inventors: Kiyotaka Takahashi, Tokyo (JP); Yuji Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/452,794

(22) Filed: Oct. 29, 2021

(65) Prior Publication Data

US 2022/0141286 A1 May 5, 2022

(30) Foreign Application Priority Data

Nov. 2, 2020 (JP) ............................. JP2020-183737

(51) Int. Cl.
*H04L 67/12* (2022.01)
*G06F 3/02* (2006.01)

(52) U.S. Cl.
CPC ............ *H04L 67/12* (2013.01); *G06F 3/0202* (2013.01)

(58) Field of Classification Search
CPC ... H04L 67/12; H04L 67/1012; H04L 63/102; H04L 67/28; H04L 45/124; H04L 47/70; H04W 4/38
See application file for complete search history.

(56) References Cited

U.S. PATENT DOCUMENTS

2010/0333207 A1* 12/2010 Etchegoyen .......... G06F 21/121 726/26
2010/0333213 A1* 12/2010 Etchegoyen .......... G06F 21/105 709/224
2015/0220308 A1* 8/2015 Condon .................... G06F 8/20 717/104
2016/0165049 A1* 6/2016 King ....................... H04M 3/12 379/265.09
2018/0139309 A1* 5/2018 Pasam ..................... H04L 69/08
2018/0146322 A1* 5/2018 Altay ....................... H04W 4/70
2018/0184472 A1* 6/2018 Ohtani ................ H04L 12/2807
(Continued)

FOREIGN PATENT DOCUMENTS

JP 2017-167747 A 9/2017

*Primary Examiner* — Tonia L Dollinger
*Assistant Examiner* — Linh T. Nguyen
(74) *Attorney, Agent, or Firm* — Crowell & Moring LLP

(57) ABSTRACT

To provide a relay apparatus and a relay method by which an app can be flexibly connected to a device and various apps can be connected to various devices to realize stable operation. The invention is a relay method for mediating a connection between an app and a device, and the relay method includes: when an input specification of data required for an app whose use is to be started is input, comparing an output specification held by each processing node provided in an existing data processing path with a data item included in the input specification; connecting an output of the data processing path to the app whose use is to be started if the existing processing node and the existing data processing path are able to satisfy the input specification; adding a new processing node and comparing an output specification of the new processing node with the input specification if the existing data processing path is not able to satisfy the input specification; and connecting an output of the new processing node to the app whose use is to be started if the new processing node is able to satisfy the input specification.

8 Claims, 15 Drawing Sheets

(56) References Cited

U.S. PATENT DOCUMENTS

| | | | | |
|---|---|---|---|---|
| 2019/0058768 | A1* | 2/2019 | Feijoo | H04L 67/16 |
| 2019/0095545 | A1 | 3/2019 | Yamato | |
| 2020/0128486 | A1* | 4/2020 | Herrmann | G01S 5/019 |
| 2020/0173786 | A1* | 6/2020 | Viswanathan | G05D 1/0278 |
| 2020/0310394 | A1* | 10/2020 | Wouhaybi | H04L 69/40 |
| 2022/0083325 | A1* | 3/2022 | Yu | G05B 19/4184 |

* cited by examiner

| # | NAME | THE NUMBER OF INPUT SPECIFICATIONS | INPUT SPECIFICATION | | THE NUMBER OF OUTPUT SPECIFICATIONS | OUTPUT SPECIFICATION | |
|---|---|---|---|---|---|---|---|
| | | | DATA ITEM | FREQUENCY | | DATA ITEM | FREQUENCY |
| 1 | DETERMINATION OF PRESENCE OR ABSENCE OF WORKER (IMAGE) | 1 | STILL IMAGE | 1fps | 1 | PRESENCE OR ABSENCE | 1Hz |
| 2 | MEASUREMENT OF THE NUMBER OF WORKERS (IMAGE) | 1 | STILL IMAGE | 1fps | 1 | THE NUMBER OF WORKERS | 1Hz |
| 3 | EXTRACTION OF MOTION TRAJECTORY OF WORKER (IMAGE) | 1 | STILL IMAGE | 10fps | 1 | MOTION TRAJECTORY | 10Hz |
| 4 | CUT OUT OF STILL IMAGE (LOW RATE) | 1 | H.264 | PROFILE: Main | 2 | STILL IMAGE | 0.1fps |
| 5 | — | — | — | — | — | STILL IMAGE | 1fps |
| 6 | CUT OUT OF STILL IMAGE (MEDIUM RATE) | 1 | H.264 | PROFILE: Main | 2 | STILL IMAGE | 1fps |
| 7 | — | — | — | — | — | STILL IMAGE | 10fps |
| 8 | ... | | | | | | |

| # | NAME | THE NUMBER OF OUTPUT SPECIFICATIONS | OUTPUT SPECIFICATION | |
|---|---|---|---|---|
| | | | DATA ITEM | FREQUENCY |
| 1 | Web CAMERA | 1 | H.264 | PROFILE: Main |
| 2 | VIBRATION SENSOR | 1 | ACCELERATION | 10Hz |
| 3 | PRESSURE SENSOR | 1 | PRESSURE | 1Hz |
| 4 | ... | | | |
| 5 | ... | | | |
| 6 | ... | | | |
| 7 | ... | | | |
| 8 | ... | | | |

| # | NAME | THE NUMBER OF INPUT SPECIFICATIONS | INPUT SPECIFICATION | |
|---|---|---|---|---|
| | | | DATA ITEM | FREQUENCY |
| 1 | WORK INSTRUCTION APP | 1 | PRESENCE OR ABSENCE | 1Hz |
| 2 | WORK STATUS VISUALIZATION APP | 1 | THE NUMBER OF WORKERS | 1Hz |
| 3 | FLOW LINE VISUALIZATION APP | 1 | MOTION TRAJECTORY | 10Hz |
| 4 | ... | | | |
| 5 | ... | | | |
| 6 | ... | | | |
| 7 | ... | | | |
| 8 | ... | | | |

| # | NAME | THE NUMBER OF INPUTS | INPUT SOURCE # | THE NUMBER OF OUTPUTS | OUTPUT DESTINATION # |
|---|---|---|---|---|---|
| 1 | WORK INSTRUCTION APP | 1 | 4 | — | — |
| 2 | WORK STATUS VISUALIZATION APP | 1 | 5 | — | — |
| 3 | FLOW LINE VISUALIZATION APP | 1 | 6 | — | — |
| 4 | DETERMINATION OF PRESENCE OR ABSENCE OF WORKER (IMAGE) | 1 | 8 | 1 | 1 |
| 5 | MEASUREMENT OF THE NUMBER OF WORKERS (IMAGE) | 1 | 8 | 1 | 2 |
| 6 | EXTRACTION OF MOTION TRAJECTORY OF WORKER (IMAGE) | 1 | 8 | 1 | 3 |
| 7 | CUT OUT OF STILL IMAGE (LOW RATE) | — | — | — | — |
| 8 | CUT OUT OF STILL IMAGE (MEDIUM RATE) | 1 | 9 | 3 | 4 |
| 9 | — | — | — | — | 5 |
| 10 | — | — | — | — | 6 |
| 11 | Web CAMERA | — | — | 1 | 8 |

| CONNECTION PATTERN # (T501) | NAME (T502) | # (T503) | INPUT SOURCE # (T504) | OUTPUT DESTINATION # (T505) |
|---|---|---|---|---|
| 1 | WORK INSTRUCTION APP | 1 | 2 | — |
| | DETERMINATION OF PRESENCE OR ABSENCE OF WORKER (IMAGE) | 2 | 3 | 1 |
| | CUT OUT OF STILL IMAGE (LOW RATE) | 3 | 4 | 2 |
| | Web CAMERA | 4 | — | 3 |
| 2 | WORK INSTRUCTION APP | 1 | 2 | — |
| | DETERMINATION OF PRESENCE OR ABSENCE OF WORKER (IMAGE) | 2 | 3 | 1 |
| | CUT OUT OF STILL IMAGE (MEDIUM RATE) | 3 | 4 | 2 |
| | Web CAMERA | 4 | — | 3 |
| 3 | WORK INSTRUCTION APP | 1 | 2 | — |
| | DETERMINATION OF PRESENCE OR ABSENCE OF WORKER (PRESSURE) | 2 | 3 | 1 |
| | PRESSURE SENSOR | 3 | — | 2 |
| ... | ... | | | |

| SITE CATEGORY # (T601) | NAME (T602) |
|---|---|
| 1 | WORK INSTRUCTION APP |
| | WORK STATUS VISUALIZATION APP |
| | FLOW LINE VISUALIZATION APP |
| 2 | ATTENDANCE MANAGEMENT APP |
| | WORK PROGRESS MANAGEMENT APP |
| | PRODUCTION PLANNING APP |
| 3 | QUALITY CONTROL APP |
| | DEFECTIVE RATE MEASUREMENT APP |
| | INVENTORY MANAGEMENT APP |
| ... | ... |

| EFFECTIVE CONNECTION PATTERN # | NAME | # | INPUT SOURCE # | OUTPUT DESTINATION # | THE NUMBER OF APPEARANCES |
|---|---|---|---|---|---|
| 1 | WORK INSTRUCTION APP | 1 | 2 | — | — |
| | DETERMINATION OF PRESENCE OR ABSENCE OF WORKER (IMAGE) | 2 | 3 | 1 | 2 |
| | CUT OUT OF STILL IMAGE (LOW RATE) | 3 | 4 | 2 | 1 |
| | Web CAMERA | 4 | — | 3 | 3 |
| 2 | WORK INSTRUCTION APP | 1 | 2 | — | — |
| | DETERMINATION OF PRESENCE OR ABSENCE OF WORKER (IMAGE) | 2 | 3 | 1 | 2 |
| | CUT OUT OF STILL IMAGE (MEDIUM RATE) | 3 | 4 | 2 | 2 |
| | Web CAMERA | 4 | — | 3 | 3 |
| 3 | FLOW LINE VISUALIZATION APP | 1 | 2 | — | — |
| | EXTRACTION OF MOTION TRAJECTORY OF WORKER (IMAGE) | 2 | 3 | 1 | 1 |
| | CUT OUT OF STILL IMAGE (MEDIUM RATE) | 3 | 4 | 2 | 2 |
| | Web CAMERA | 4 | — | 3 | 3 |
| … | … | | | | |

RELAY APPARATUS AND RELAY METHOD

BACKGROUND OF THE INVENTION

1. Field of the Invention

The present invention relates to a relay apparatus and a relay method used for the same.

2. Description of the Related Art

There is JP-A-2017-167747 as a related art literature in the technical field. JP-A-2017-167747 discloses a method in which, based on an input specification of an application (hereinafter, abbreviated as an app) and output specifications of devices, a combination of devices satisfying a request of the app is selected so as to connect the app and the device.

In order to provide apps that meet needs of various customers in environments such as factories of the various customers, it is necessary to, when use of an app is to be started, appropriately select and connect a device in an environment in which an input specification of the app can be satisfied. At this time, in a method in the related art, as in JP-A-2017-167747, in order to select a combination of devices satisfying a request of an app, it is necessary to create the app such as designing an input specification of the app according to an output specification of a device by making the app and the device correspond to each other in a one-to-one manner, and man-hours are required for providing various apps to the environments of the various customers according to the needs of the customers.

Therefore, it is desired that the app can be flexibly connected to the device by inserting a processing node between the app and the device and loosely coupling the app and the device, but in order to connect various apps to various devices and stably operate the various apps, it is necessary to efficiently operate the processing node on a relay apparatus that connects the app and the device.

SUMMARY OF THE INVENTION

In view of the above problems, an object of the invention is to provide a relay apparatus and a relay method by which an app can be flexibly connected to a device and various apps can be connected to various devices to realize stable operation. The invention is, for example, a relay method for mediating a connection between an app and a device, and the relay method includes: when an input specification of data required for an app whose use is to be started is input, comparing an output specification held by each processing node provided in an existing data processing path with a data item included in the input specification; connecting an output of the data processing path to the app whose use is to be started if the existing processing node and the existing data processing path are able to satisfy the input specification; adding a new processing node and comparing an output specification of the new processing node with the input specification if the existing data processing path is not able to satisfy the input specification; and connecting an output of the new processing node to the app whose use is to be started if the new processing node is able to satisfy the input specification.

According to the invention, a relay apparatus and a relay method can be provided by which an app can be flexibly connected to a device and various apps can be connected to various devices to realize stable operation.

BRIEF DESCRIPTION OF THE DRAWINGS

FIG. 2 is a configuration example of a processing node management table in the embodiment.

FIG. 3 is a configuration example of a device management table in the embodiment.

FIG. 4 is a configuration example of an app management table in the embodiment.

FIG. 5 is a configuration example of a data processing path management table in the embodiment.

FIG. 6 is a configuration example of a connection pattern management table in the embodiment.

FIG. 7 is a configuration example of a high use-frequency app management table in the embodiment.

FIG. 8 is a configuration example of a number-of-appearances management table in the embodiment.

DESCRIPTION OF THE PREFERRED EMBODIMENTS

Hereinafter, an embodiment of the invention will be described with reference to drawings.

[Embodiment]

The present embodiment relates to a relay apparatus that relays data from an on-site device in a factory or the like or data from a sensor attached to the on-site device, to an app provided by using an internet of things (IoT) platform in a cloud or an edge/fog. For example, the relay apparatus receives operating data from the on-site device or sensing data from the sensor and transmits the data to the app on the cloud in an environment in which various configured functions are dynamically provided and a configuration of software that dynamically executes the functions in operation with each other in an autonomous-decentralized manner changes. Further, when relay processing required for connecting an app that uses data with an on-site device or a sensor that provides the data is provided, by sharing the relay processing that has already been provided, many diverse apps are connected to many on-site devices or sensors via the IoT platform and a system as a whole is stabilized and scalable to provide high operability.

Figure 1:
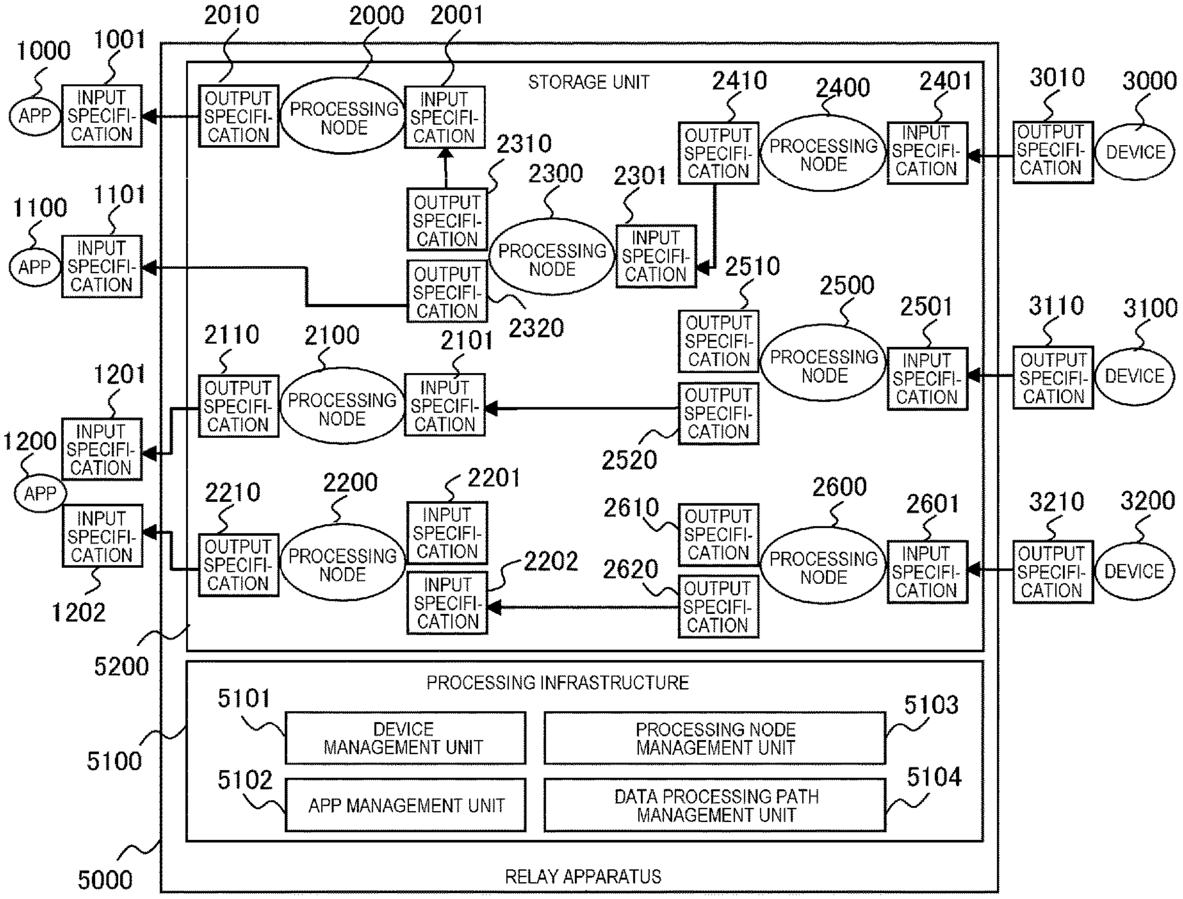
FIG. 1 is a functional configuration diagram of a system to which a relay apparatus in an embodiment is applied.

FIG. 1 is a functional configuration diagram of a system targeted by the relay apparatus in the present embodiment. As shown in FIG. 1, in the system, apps 1000, 1100, and 1200 that perform advanced analysis processing or the like in a computer environment such as a cloud are deployed, and input specifications 1001, 1101, 1201, and 1202 that specify specifications of data to be received are defined for the respective apps. In addition, machine tools, or devices 3000, 3100, and 3200 are installed in a manufacturing site such as a factory, and output specifications 3010, 3110, and 3210 that specify specifications of data to be output are defined for the respective devices. The respective apps and the respective devices are connected to each other via a relay apparatus 5000.

In order to connect the apps 1000 to 1200 with the devices 3000 to 3200 to realize data exchange, the relay apparatus 5000 is provided with processing nodes 2000 to 2600 for matching (hereafter, "match" is used in the same meaning as "satisfy") the input specifications 1001 to 1202 of the respective apps 1000 to 1200 with the output specifications 3010 to 3210 of the devices to be connected by adjusting or converting these specifications. For the processing nodes 2000 to 2600, input specifications 2001 to 2601 that specify specifications of data to be received by the processing nodes are defined, and output specifications 2010 to 2620 that specify specifications of data to be output are defined.

Further, in the apps 1000 to 1200, the processing nodes 2000 to 2600, and the devices 3000 to 3200, those having the input specifications and the output specifications whose contents match each other can be connected to each other.

In FIG. 1, the relay apparatus 5000 is described as a processing infrastructure 5100 that is a common function for executing these processing nodes, and a storage unit 5200 that stores programs functioning as the processing nodes that depend on the apps and the devices and are not generalized.

The processing infrastructure 5100 includes: a device management unit 5101 that manages the devices installed in the site and connected to the apps; an app management unit 5102 that manages the apps executed in a cloud or an on-premises environment and connected to the devices; a processing node management unit 5103 that manages the processing nodes that relay and connect the apps and the devices; and a data processing path management unit 5104 that manages a connection relationship of the processing nodes that relay the apps and the devices to transmit the data.

Processing of executing the processing nodes 2000 to 2600 stored in the storage unit 5200 is executed by executing app connection processing performed by an app connection processing unit (not shown) in cooperation with processing performed by the processing infrastructure 5100.

In addition, as a hardware image of the relay apparatus 5000, the relay apparatus 5000 is implemented by an apparatus which is a general information processing apparatus and includes a processing device (CPU), a storage device (memory), and an input and output interface (I/F). That is, the processing performed by the processing infrastructure 5100 and the app connection processing that is the processing of executing the processing nodes 2000 to 2600 stored in the storage unit 5200 is executed by the CPU performing software processing based on the data and the programs for processing those processing nodes stored in the storage device that is the storage unit 5200. Image processing may be executed by a graphics processing unit (GPU). In addition, the app and the device are connected via the I/F.

FIG. 2 is a configuration example of a processing node management table T100 held by the processing node management unit 5103 in the present embodiment. The processing node management table T100 is a table that manages attributes of processing nodes currently being executed by the relay apparatus. As shown in FIG. 2, the processing node management table T100 includes the following attributes related to the processing nodes being currently operated in the relay apparatus: an internally assigned serial number T101; a name T102 of a processing node; the number of input specifications T103 of the processing node; an input specification T104 including a data item T105 and an input frequency T106 of data in the processing node; the number of output specifications T107 of the processing node; and an output specification T108 including a data item T109 and an output frequency T110 of data in the processing node.

FIG. 3 is a configuration example of a device management table T200 held by the device management unit 5101 in the present embodiment. The device management table T200 is a table that manages on-site devices currently accommodated by the relay apparatus. As shown in FIG. 3, the device management table T200 includes an internally assigned serial number T201, a name T202 of a device, the number of output specifications T203 of the device, and an output specification T204 including a data item T205 and an output frequency T206 of data in the device.

FIG. 4 is a configuration example of an app management table T300 held by the app management unit 5102 in the present embodiment. The app management table T300 is a table that manages apps that operate in the cloud or the on-premises environment and are currently accommodated by the relay apparatus. As shown in FIG. 4, the app management table T300 includes an internally assigned serial number T301, a name T302 of an app, the number of input specifications T303 of the app, and an input specification T304 including a data item T305 and an input frequency T306 of data in the app.

FIG. 5 is a configuration example of a data processing path management table T400 held by the data processing path management unit 5104 in the present embodiment. As shown in FIG. 5, the data processing path management table T400 includes: an internally assigned serial number T401; a name T402 of an app, a processing node, or a device; the number of inputs T403 indicating the number of connections on an input side where the app, the processing node, or the device permits connection; an input source #T404 indicating a serial number that identifies a processing node or a device currently connected to the app, the processing node, or the device; the number of outputs T405 indicating the number of connections on an output side where the processing node or the device permits connection; and an output destination #T406 indicating a serial number that identifies a processing node or an app currently connected to the processing node or the device.

FIG. 6 is a configuration example of a connection pattern management table T500 managed by the processing infrastructure 5100 in the present embodiment. The connection pattern management table T500 is a table for managing combinations in which the relay apparatus can connect an app and a device via a processing node. As shown in FIG. 6, the connection pattern management table T500 includes: a connection pattern #T501 that is internally assigned and identifies a connection pattern; a name T502 of an app, a processing node, or a device that is a constituent of each connection pattern; #T503 indicating identifiers internally assigned to the app, the processing node, or the device that is a constituent of the connection pattern; an input source #T504 indicated by #T503 of an app, a processing node, or a device connected to an input side of the app, the processing node, or the device that is a constituent of each connection pattern; and an output destination #T505 indicated by #T503 of a processing node or a device connected to an output side of the app or the processing node that is a constituent of each connection pattern.

FIG. 7 is a configuration example of a high use-frequency app management table T600 managed by the processing infrastructure 5100 in the present embodiment. The high use-frequency app management table T600 is a table for managing apps used with a high frequency in sites having features, when the sites where the apps are used, for example, manufacturing sites, are classified according to features such as whether a target is a mass-produced product or a custom-made product, whether the target is high-mix low-volume production or low-mix mass production, and whether the target is line production, cell production, or job-shop production. As shown in FIG. 7, the high use-frequency app management table T600 includes a site category #T601 that identifies each category, and a name T602 of an app having a high use frequency in the site in the category.

FIG. 8 is a configuration example of a number-of-appearances management table T700 managed by the processing infrastructure 5100 in the present embodiment. The number-of-appearances management table T700 is a table for managing effective connection patterns in a specific site, and the effective connection patterns are obtained by, when on-site devices that can be used in the site are clarified and apps having a high use frequency are clarified based on the features of the site, extracting, from the connection pattern management table T500, combinations in which the relay apparatus can connect apps that are expected to have a high use frequency in the site with devices that can be used in the site. As shown in FIG. 8, the number-of-appearances management table T700 includes: an effective connection pattern #T701 that is an ID which is internally assigned and identifies an effective connection pattern in the site; a name T702 of the app, the processing node, or the device that is a constituent of each effective connection pattern; #T703 indicating an identifier internally assigned to the app, the processing node, or the device; an input source #T704 indicated by #T703 of the app, the processing node, or the device connected to the input side of the app, the processing node, or the device that is a constituent of each effective connection pattern; an output destination #T705 indicated by #T703 of the processing node or the device connected to the output side of the app or the processing node that is a constituent of each effective connection pattern; and the number of appearances T706 indicating the number of times the processing node or the device indicated by the name T702 appears in all of the effective connection patterns of the number-of-appearances management table T700. A processing node or a device in which the number of appearances T706 has a large numerical value is highly likely to be used in the site, and is highly likely to be shared among a plurality of apps or a plurality of devices.

Figure 9A:
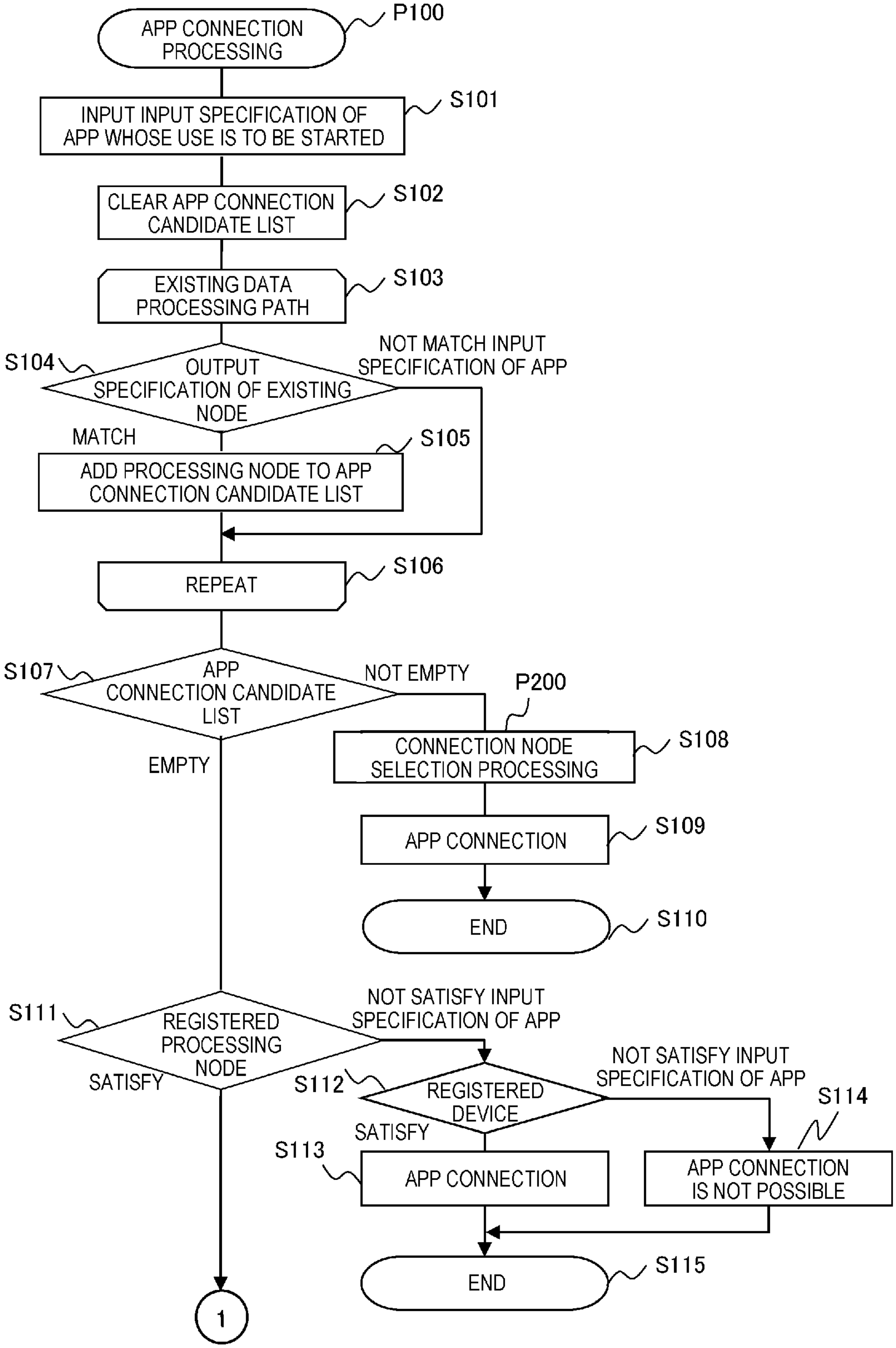
FIG. 9A is a flowchart (1/3) of app connection processing in the embodiment.
Figure 9B:
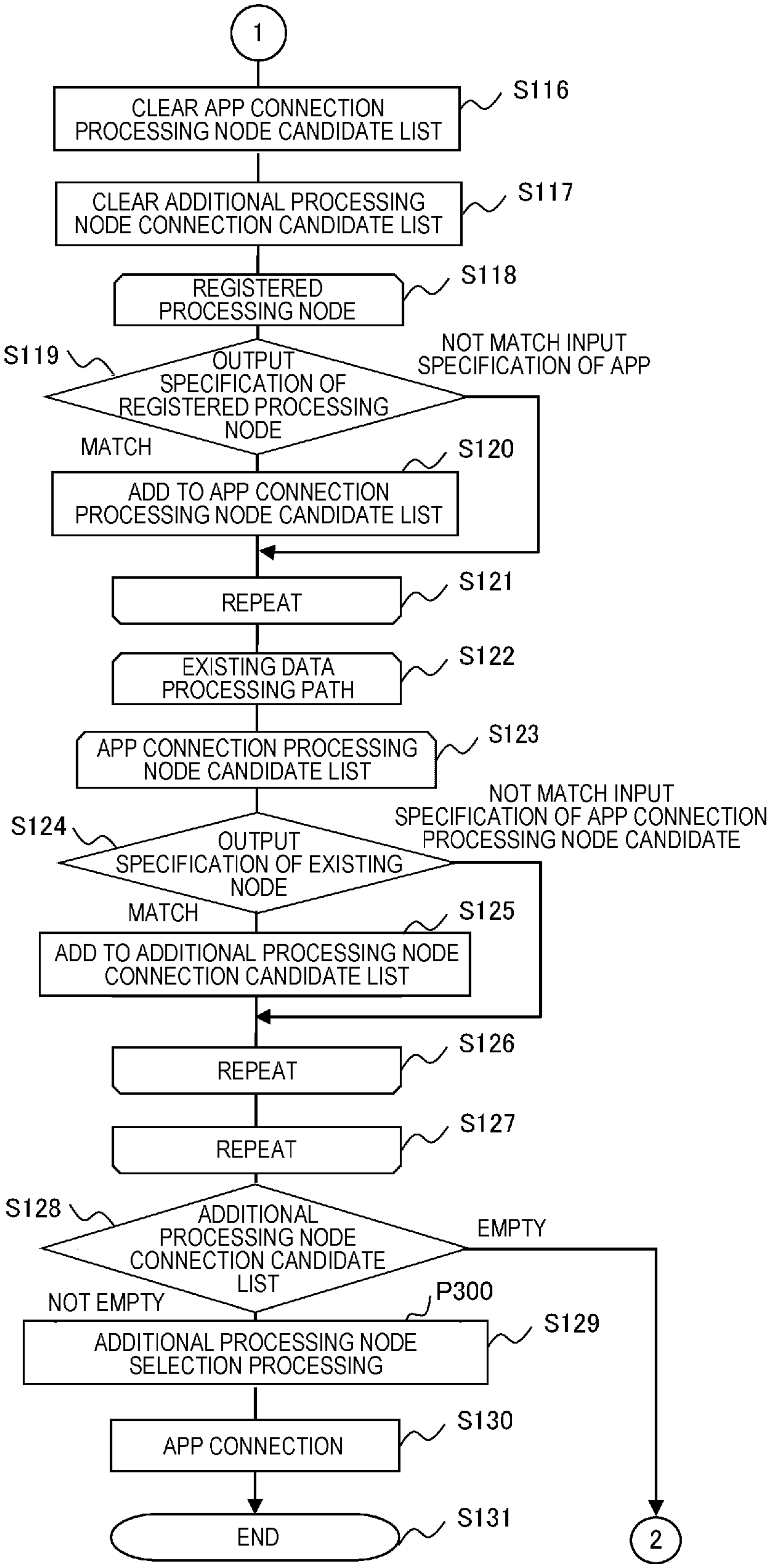
FIG. 9B is a flowchart (2/3) of the app connection processing in the embodiment.
Figure 9C:
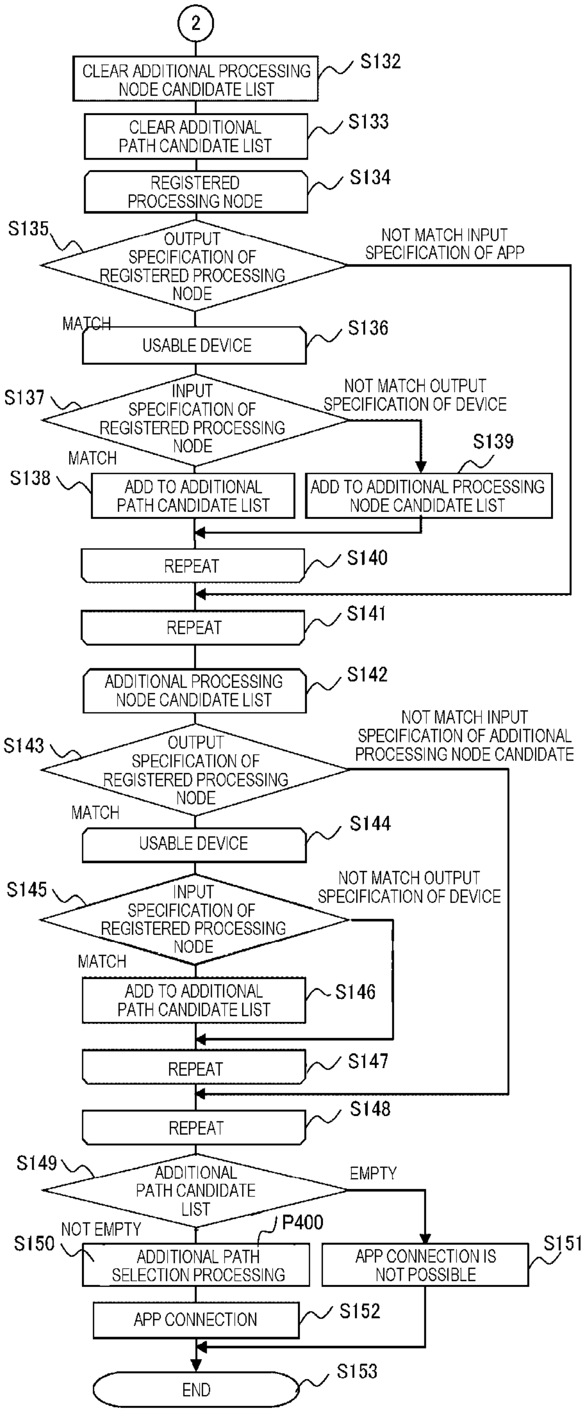
FIG. 9C is a flowchart (3/3) of the app connection processing in the embodiment.

FIGS. 9A, 9B, and 9C show a flowchart P100 of app connection processing when the relay apparatus in the present embodiment connects an app and a device. FIGS. 9A, 9B, and 9C form one continuous processing flowchart, which is divided into three drawings and shown because of space limitations.

In the app connection processing, first, as shown in FIG. 9A, it is checked whether or not the app whose use is to be started can be connected to a processing node that has already been operated in the relay apparatus. Next, as shown in FIG. 9B, if the app whose use is to be started cannot be connected to the processing node being currently operated, a new processing node is added and it is checked whether or not a device already used in the relay apparatus cannot be used. Then, as shown in FIG. 9C, if the device already used in the relay apparatus cannot be used, it is checked whether or not the app cannot be connected to another device registered in the relay apparatus. Hereinafter, the processing will be described in detail.

In FIG. 9A, first, in step S101, when the app is to be provided to a site where the device accommodated by the relay apparatus is installed, an input specification of the app whose use is to be started is input. Next, in step S102, a memory that stores processing nodes serving as candidates to which the app whose use is to be started can be connected is cleared. Then, between step S103 and step S106, the following steps S104 and S105 are repeated for all processing nodes registered in the data processing path management table T400. That is, in step S104, comparison is made to determine whether or not an output specification of the processing node registered in the data processing path management table T400 matches the input specification, that is, the data item or the frequency of the app whose use is to be started. Further, if the output specification of the processing node registered in the data processing path management table T400 matches the input specification of the app whose use is to be started, in step S105, an identifier of the processing node is stored in the memory that stores the processing nodes serving as the candidates to which the app whose use is to be started can be connected.

Then, in step S107, it is evaluated whether or not a processing node serving as a candidate to which the app is connected is stored in the memory that stores the processing nodes serving as the candidates to which the app whose use is to be started can be connected. If the processing node serving as the candidate is stored, the processing proceeds to step S108, and connection node selection processing P200 is called. Details of the connection node selection processing P200 will be described later. Then, in step S109, the app is connected to the selected processing node, and the app connection ends (step S110).

If the processing node serving as the candidate is not stored in step S107, in step S111, it is evaluated whether or not there is a processing node that satisfies the input specification of the app whose use is to be started among the processing nodes registered in the relay apparatus. Then, if there is a processing node that satisfies the input specification of the app among the registered processing nodes, the processing proceeds to step S116 in FIG. 9B. If there is no processing node that satisfies the input specification of the app among the registered processing nodes, the processing proceeds to step S112, and it is evaluated whether or not there is no device that satisfies the input specification of the app among the devices registered in the relay apparatus. If there is no device that satisfies the input specification of the app, the processing proceeds to step S114, the app whose use is to be started is determined to be unusable in the site where the relay apparatus operates, and the result is displayed. If there is a device that satisfies the input specification of the app, the processing proceeds to step S113, and the app whose use is to be started is directly connected to the corresponding device. Then, the processing proceeds to step S115, and the app connection ends.

In FIG. 9B, in step S116, the memory that stores the processing nodes serving as the candidates to which the app whose use is to be started can be connected is cleared. Further, in step S117, a memory that stores existing processing nodes to which the new processing node for connecting the app whose use is to be started can be connected is cleared. Then, between step S118 and step S121, the following steps S119 and S120 are repeated for all the processing nodes registered in the relay apparatus. That is, in step S119, it is evaluated whether or not the input specification of the app whose use is to be started matches the output specification of the processing node. If the input specification of the app whose use is to be started matches the output specification of the processing node, in step S120, an identifier of the processing node is stored in the memory that stores the processing nodes serving as the candidates to which the app whose use is to be started can be connected.

Then, between step S122 and step S127, processing between step S123 and step S126 is repeated for all the processing nodes registered in the data processing path management table T400.

In the processing between step S123 and step S126, processing of step S124 and step S125 is repeated while there is a processing node matching the input specification of the app whose use is to be started from among the processing nodes registered in the relay apparatus. That is, in step S124, it is evaluated whether or not the output specification of the processing node registered in the data processing path management table T400 matches an input specification of the processing node matching the input specification of the app whose use is to be started from among the processing nodes registered in the relay apparatus. Then, if the output specification of the processing node registered in the data processing path management table T400 matches the input specification of the processing node matching the input specification of the app whose use is to be started from among the processing nodes registered in the relay apparatus, in step S125, an identifier of the processing node having the output specification matching the input specification of the app, and an identifier of the processing node that is registered in the data processing path management table T400 and has the output specification matching the input specification of the processing node, are stored in an additional processing node connection candidate list.

Then, in step S128, it is evaluated whether or not a processing node serving as a candidate is stored in the additional processing node connection candidate list. Then, if the processing node serving as the candidate is not stored, the processing proceeds to step S132 in FIG. 9C. If the processing node serving as the candidate is stored, the processing proceeds to step S129, and additional processing node selection processing P300 is called using information of these processing nodes serving as the candidates. Details of the additional processing node selection processing P300 will be described later. Then, in step S130, the app is connected using information of the selected processing node to be added and the existing processing node to which the processing node is to be connected, and the app connection ends (step S131).

In FIG. 9C, a new path in which the app and the device are relayed via one or two processing nodes is searched for. First, in step S132, the memory that stores the processing nodes serving as the candidates to which the app whose use is to be started can be connected is cleared. In addition, in step S133, a memory that stores candidates of a path to be newly added for connecting the app whose use is to be started is cleared.

Next, between step S134 and step S141, processing of step S135 and processing between step S136 and step S140 is repeated for all the processing nodes registered in the relay apparatus.

In the processing of step S135, it is evaluated whether or not the input specification of the app whose use is to be started matches the output specification of the processing node, and if the input specification of the app whose use is to be started matches the output specification of the processing node, the processing between step S136 and step S140 is repeated. If the input specification of the app and the output specification of the processing node do not match, the processing of step S135 is repeated for a next processing node registered in the relay apparatus.

In the processing between step S136 and step S140, processing of step S137, step S138, and step S139 is repeated the number of times corresponding to the number of devices in the relay apparatus that can be used. That is, in step S137, it is evaluated whether or not the input specification of the processing node whose output specification matches the input specification of the app whose use is to be started matches the output specification of the device. Then, if the input specification of the processing node matches the output specification of the device, in step S138, a combination of the processing node and the device is stored in an additional path candidate list. If the input specification of the processing node does not match the output specification of the device, in step S139, the combination of the processing node and the device is stored in an additional processing node candidate list.

Next, between step S142 and step S148, processing of step S143 and processing between step S144 and step S147 is repeated for all processing nodes stored in the additional processing node candidate list.

In the processing of step S143, it is evaluated whether or not an input specification of the processing node stored in the additional processing node candidate list matches the output specification of the processing node registered in the relay apparatus, and if the input specification of the processing node stored in the additional processing node candidate list matches the output specification of the processing node registered in the relay apparatus, the processing between step S144 and step S147 is repeated. If the input specification of the processing node stored in the additional processing node candidate list does not match the output specification of the processing node registered in the relay apparatus, the processing of step S143 is repeated for a next processing node stored in the additional processing node candidate list.

In the processing between step S144 and step S147, processing of step S145 and step S146 is repeated the number of times corresponding to the number of devices in the relay apparatus that can be used. That is, in step S145, it is evaluated whether or not the input specification of the processing node whose output specification matches the input specification of the processing node stored in the additional processing node candidate list matches the output specification of the device. Then, if the input specification of the processing node matches the output specification of the device, in step S146, a combination of the processing node and the device is stored in the additional path candidate list.

Then, in step S149, it is evaluated whether or not a list in which additional path candidates for connecting the app whose use is to be started are stored is empty. If the list in which the additional path candidate is stored is not empty, the processing proceeds to step S150, and additional path selection processing P400 is called. Details of the additional path selection processing P400 will be described later. Then, in step S152, a selected path is added to the relay apparatus and the app is connected. If the list in which the additional path candidates are stored is empty, in step S151, the app whose use is to be started is determined to be unusable in the site where the relay apparatus operates, and the result is displayed. Then, the app connection processing ends (step S153).

Figure 10:
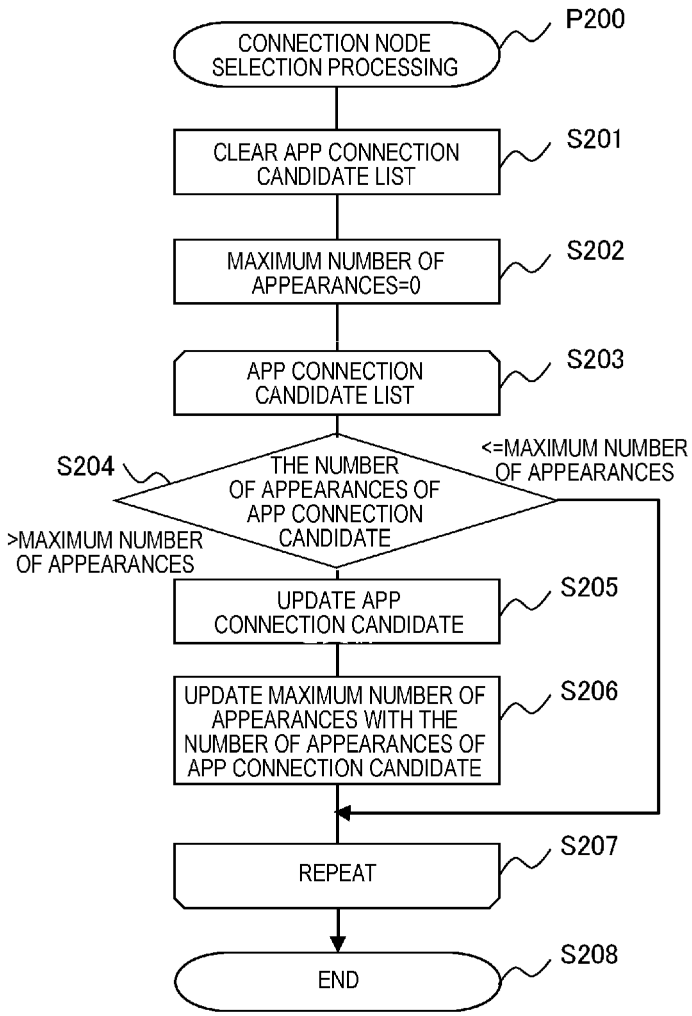
FIG. 10 is a flowchart of connection node selection processing in the embodiment.

FIG. 10 is a flowchart of the connection node selection processing P200 shown in step S108 in FIG. 9A in the present embodiment. The connection node selection processing P200 is to select, in the relay apparatus, a processing node that is most likely to be shared, among existing processing nodes used for connecting the app whose use is to be started.

In FIG. 10, first, in step S201, a memory that stores identifiers of the processing nodes used for connecting the app whose use is to be started is cleared. In addition, in step S202, in order to select a processing node that is most likely to be shared from a plurality of candidates, the maximum number of appearances in a memory that stores the number of appearances calculated for each processing node is set to zero.

Then, between step S203 and step S207, the following steps S204, S205, and 5206 are repeated for a plurality of processing node candidates that can be used for connecting the app whose use is to be started and are generated when the processing is called. That is, in step S204, the number of appearances of the processing node candidate is compared with the maximum number of appearances. Then, if the number of appearances of the processing node candidate is larger than the maximum number of appearances, in step S205, an identifier of the processing node is stored in the memory that stores the identifiers of the processing nodes used for connecting the app whose use is to be started. Further, in step S206, the maximum number of appearances is updated with the number of appearances of the processing node.

If the number of appearances of the processing node candidate is not larger than the maximum number of appearances in step S204, processing of step S204 is repeated for a next processing node candidate. Then, in step S208, connection node selection ends.

Figure 11:
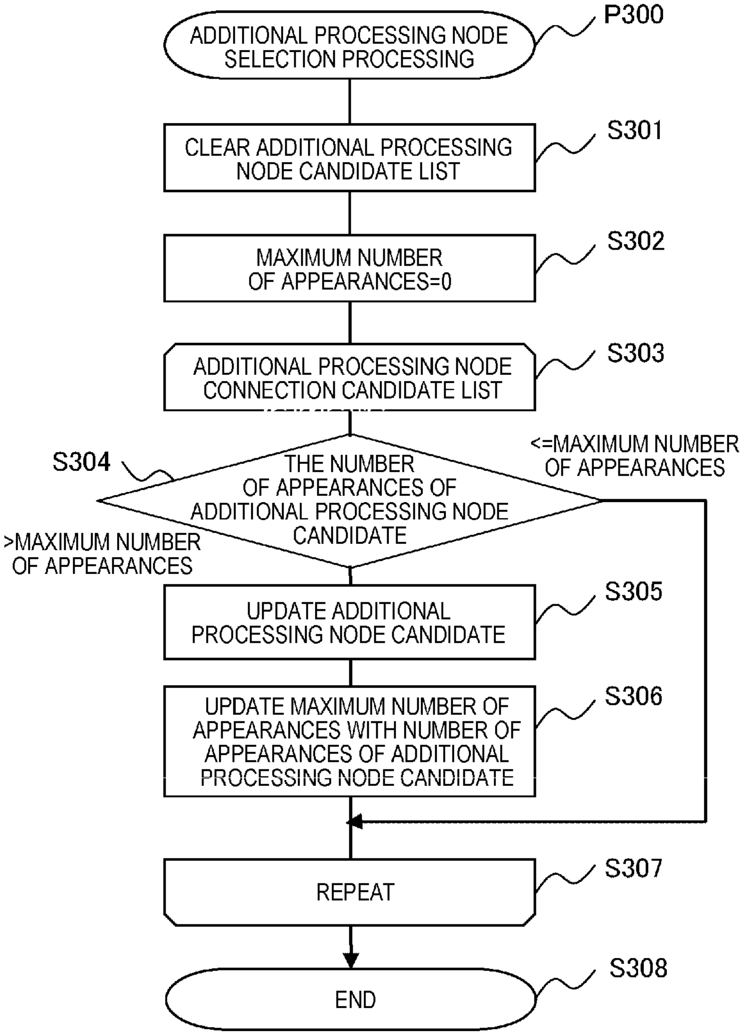
FIG. 11 is a flowchart of additional processing node selection processing in the embodiment.

FIG. 11 is a flowchart of the additional processing node selection processing P300 shown in step S129 in FIG. 9B in the present embodiment. The additional processing node selection processing P300 is to select, in the relay apparatus, a processing node that is most likely to be shared, among processing nodes to be added for connecting the app whose use is to be started.

In FIG. 11, first, in step S301, a memory that stores identifiers of the processing nodes to be added for connecting the app whose use is to be started is cleared. In addition, in step S302, in order to select a processing node that is most likely to be shared from a plurality of candidates, the maximum number of appearances in a memory that stores the number of appearances calculated for each processing node is set to zero.

Then, between step S303 and step S307, the following steps S304, S305, and S306 are repeated for a plurality of processing node candidates that can be added for connecting the app whose use is to be started and are generated when the processing is called. That is, in step S304, the number of appearances of the processing node candidate is compared with the maximum number of appearances. Then, if the number of appearances of the processing node candidate is larger than the maximum number of appearances, in step S305, an identifier of the processing node is stored in the memory that stores the identifiers of the processing nodes to be added for connecting the app whose use is to be started. Further, in step S306, the maximum number of appearances is updated with the number of appearances of the processing node.

If the number of appearances of the processing node candidate is not larger than the maximum number of appearances in step S304, processing of step S304 is repeated for a next processing node candidate. Then, in step S308, additional processing node selection ends.

Figure 12:
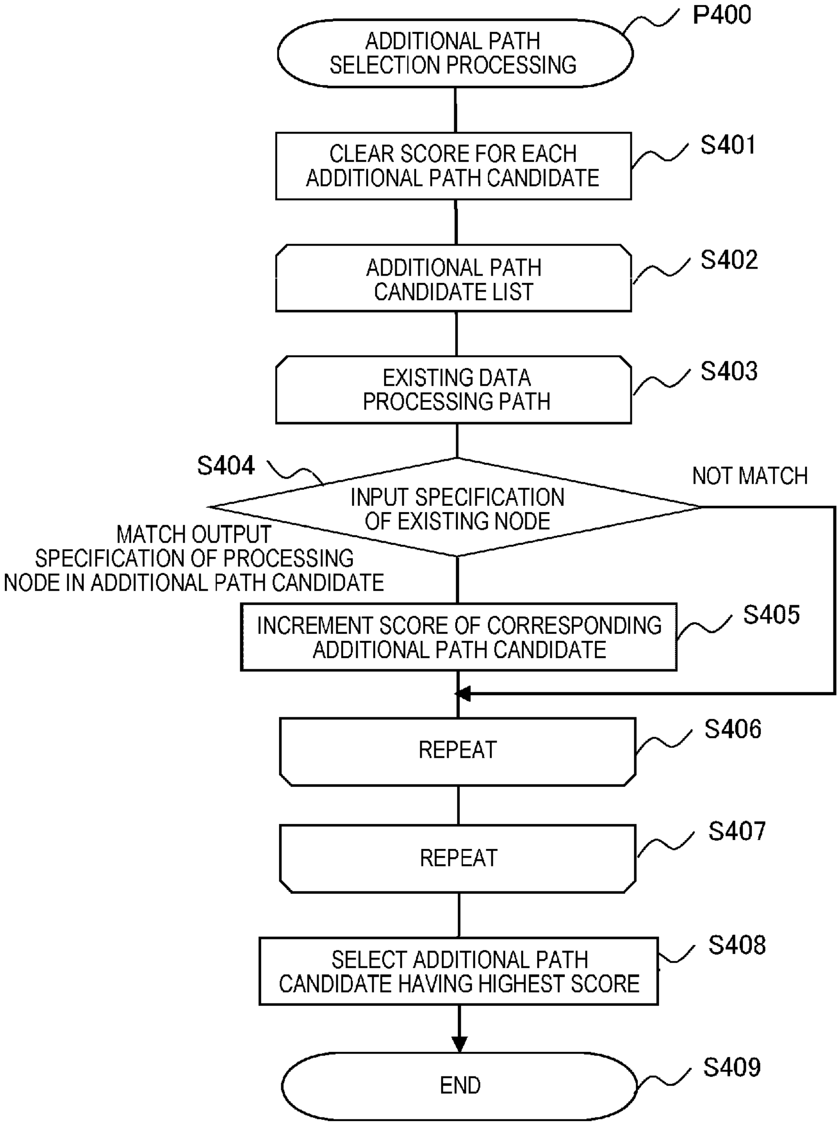
FIG. 12 is a flowchart of additional path selection processing in the embodiment.

FIG. 12 is a flowchart of the additional path selection processing P400 shown in step S150 in FIG. 9C in the present embodiment. The additional path selection processing P400 is to select, in the relay apparatus, a path to be added for connecting the app whose use is to be started.

In FIG. 12, first, in step S401, a memory that stores scores for candidates of paths to be added for connecting the app whose use is to be started is cleared to zero.

Then, between step S402 and step S407, processing between step S403 and step S406 is repeated for a list of the candidates of the path to be added for connecting the app whose use is to be started.

In the processing between step S403 and step S406, processing of step S404 and step S405 is repeated for an existing data processing path for each candidate of the path to be added. That is, in step S404, it is evaluated whether or not an output specification of a processing node constituting the candidate of the path matches an input specification of a processing node constituting the existing data processing path. Then, if the output specification of the processing node constituting the candidate of the path matches the input specification of the processing node constituting the existing data processing path, in step S405, a score of the candidate of the path is incremented in the memory that stores the scores for the candidates of the path to be added for connecting the app whose use is to be started.

If the output specification of the processing node constituting the candidate of the path does not match the input specification of the processing node constituting the existing data processing path in step S404, the processing of step S404 is repeated for a next existing data processing path.

Then, in step S408, a candidate having the highest score among the candidates of the path to be added for connecting the app whose use is to be started is selected as the path to be added this time, and additional path selection ends (step S409).

FIGS. 13, 14, 15, and 16 show a stepwise change of a use case where an app and a device are connected via the relay apparatus in the present embodiment.

Figure 13:
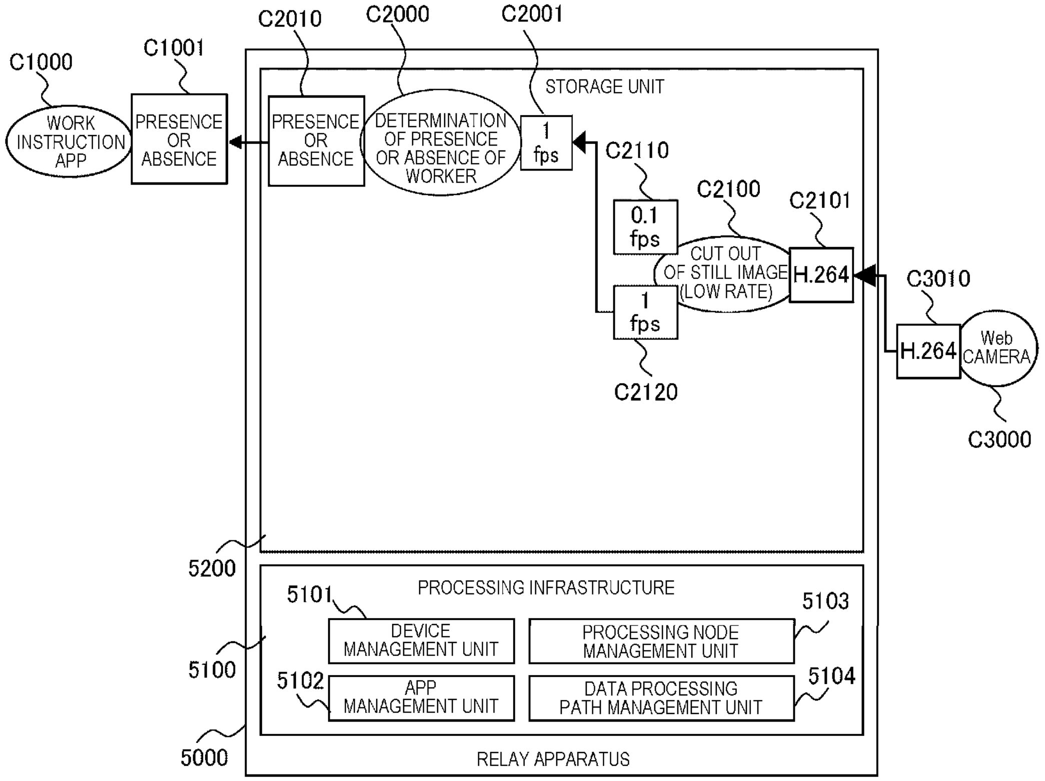
FIG. 13 is a system configuration diagram (step 1) of a use case in the embodiment.

FIG. 13 shows a situation where a work instruction app C1000 is connected to a web camera C3000 via the relay apparatus 5000. The work instruction app C1000 has an input specification C1001 including presence or absence of a worker as a data item. The web camera C3000 has an output specification including H.264 as a data item. In order to connect the web camera C3000 and the work instruction app C1000, the relay apparatus 5000 is provided with: a processing node C2000 that determines presence or absence of a worker, has an input specification C2001 including a still image as a data item and 1 fps as an input frequency, and has an output specification C2010 including the presence or absence of a worker as a data item; and a processing node C2100 that cuts out a still image at a low rate, has an input specification C2101 including H.264 as a data item, and has an output specification C2110 and an output specification C2120 including the still image as a data item and 0.1 fps and 1 fps as output frequencies.

Figure 14:
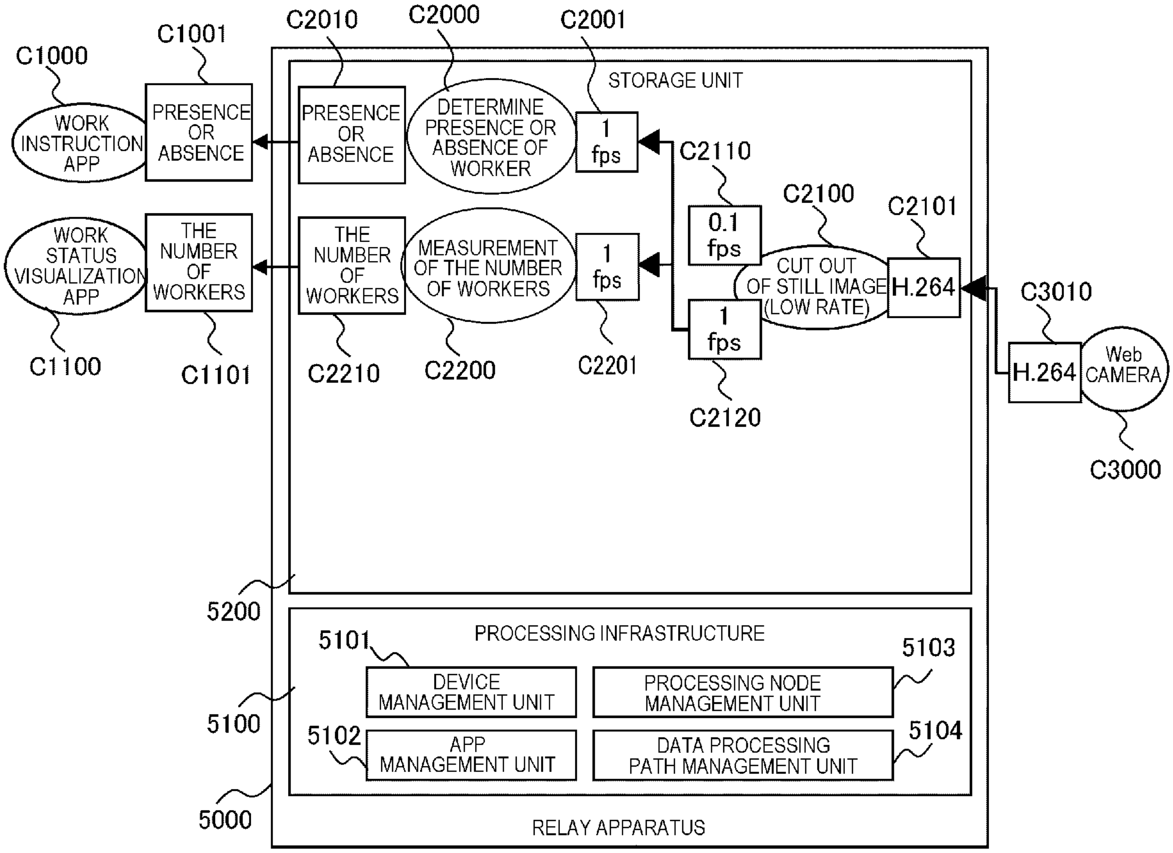
FIG. 14 is a system configuration diagram (step 2) of the use case in the embodiment.

FIG. 14 shows a situation where a work status visualization app C1100 is further added and used in an environment in FIG. 13. The work status visualization app C1100 has an input specification C1101 including the number of workers as a data item. Therefore, in order to connect the work status visualization app C1100, a processing node C2200 that measures the number of workers, has an input specification C2201 including a still image as a data item and 1 fps as an input frequency, and has an output specification C2210 including the number of workers as a data item is added to the relay apparatus 5000. At this time, the processing node C2200 that measures the number of workers uses, as a processing node to be connected as an input thereof, the processing node C2100 that cuts out the still image at a low rate and to which the in-operation processing node C2000 that determines the presence or absence of a worker is connected, thereby an amount of processing accompanying adding of the app is reduced, thus a time until the app can be used is shortened, and at the same time, efficient operation is realized by sharing resources in the relay apparatus 5000.

Figure 15:
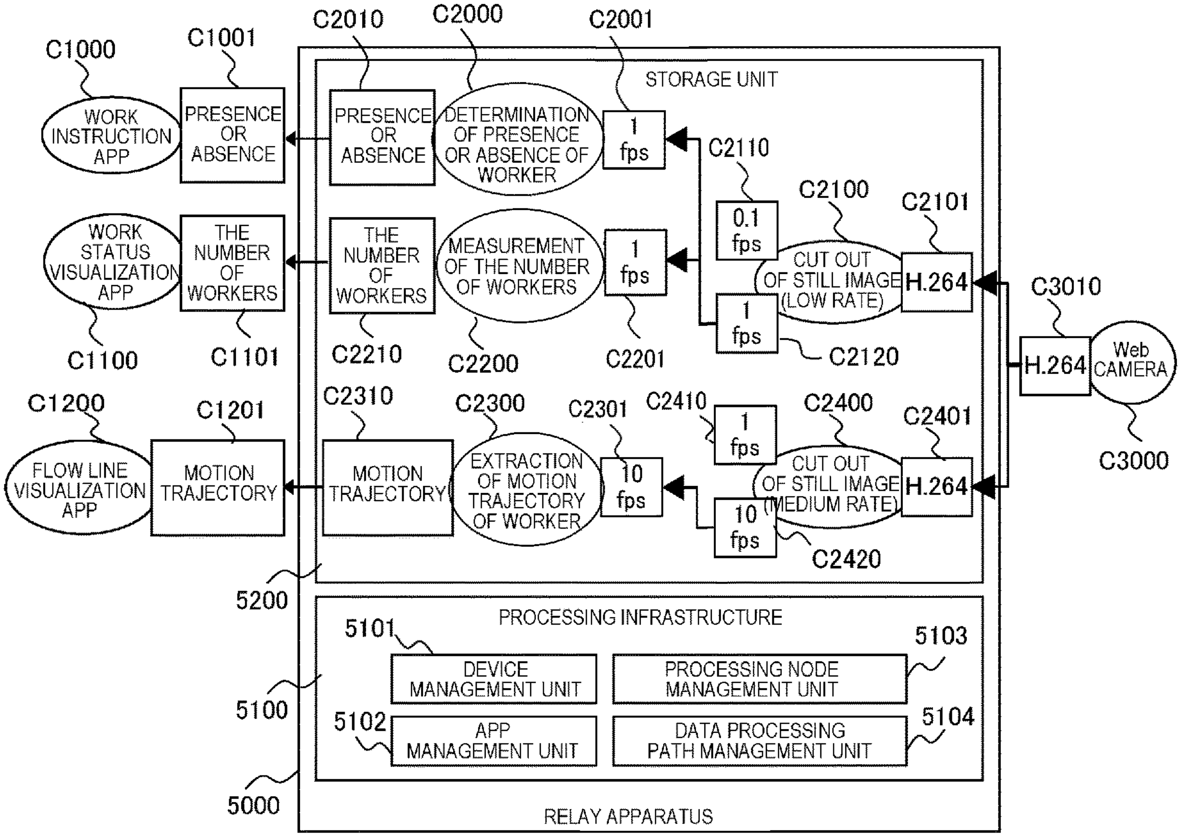
FIG. 15 is a system configuration diagram (step 3) of the use case in the embodiment.

FIG. 15 shows a situation where a worker flow line visualization app C1200 is further added and used in an environment in FIG. 14. The worker flow line visualization app C1200 has an input specification C1201 including a motion trajectory of a worker as a data item. Therefore, in order to connect the worker flow line visualization app C1200, a processing node C2300 that extracts a motion trajectory of a worker, has an input specification C2301 including a still image as a data item and 10 fps as an input frequency, and has an output specification C2310 including a motion trajectory of a worker as a data item is added to the relay apparatus 5000. However, since a processing node that satisfies the input specification of the processing node C2300 is not currently operated, a processing node C2400 that cuts out a still image at a medium rate, can be connected to the web camera C3000, has an input specification C2401 including H.264 as a data item, and has an output specification C2410 and an output specification C2420 including a still image as a data item and 1 fps and 10 fps as output frequencies is added to the relay apparatus 5000. As a result, the worker flow line visualization app C1200 can be provided.

Figure 16:
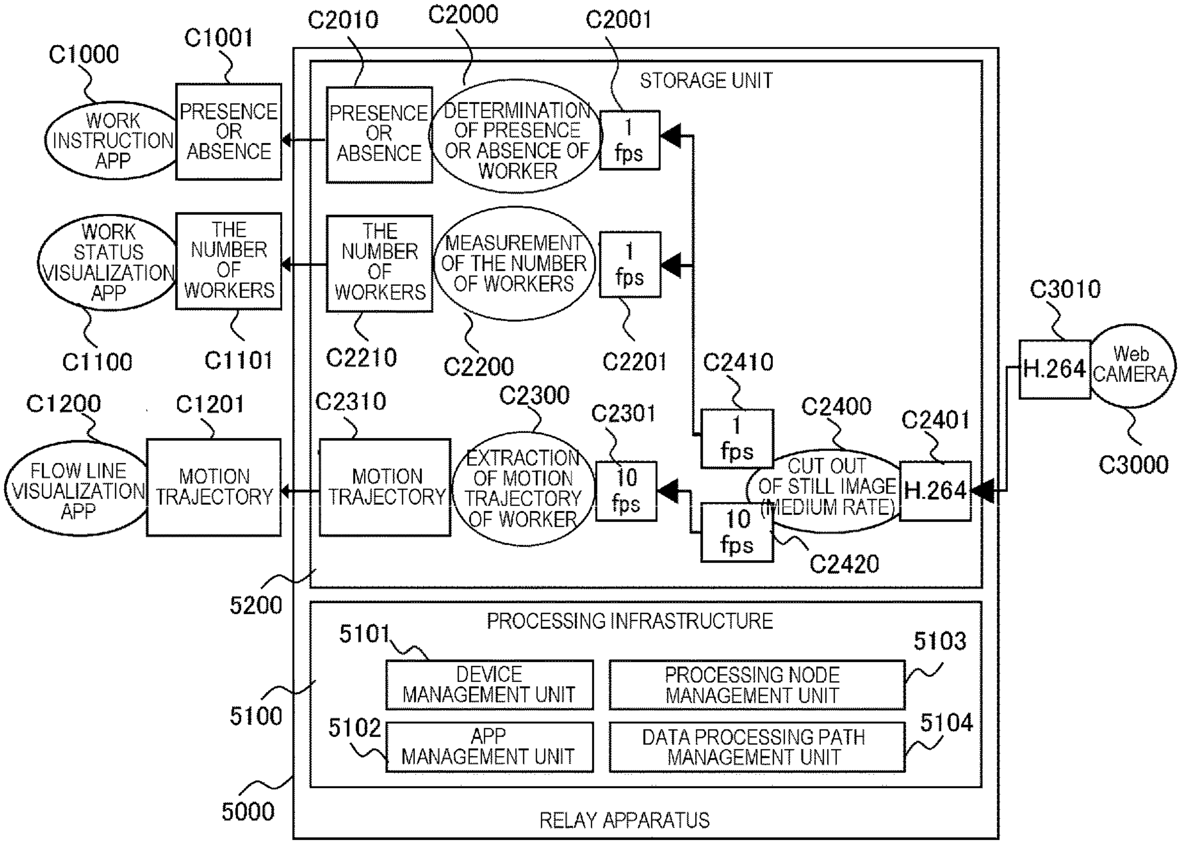
FIG. 16 is a system configuration diagram (step 4) of the use case in the embodiment.

In addition, in an environment in FIG. 15, the processing node C2400 that cuts out the still image at a medium rate and is added for connecting the worker flow line visualization app C1200, can also be used as inputs of the processing node C2000 that determines the presence or absence of a worker and the processing node C2200 that measures the number of workers, which are respectively connected to the work instruction app C1000 and the work status visualization app C1100 that are already provided. Therefore, FIG. 16 shows a situation where the processing node C2100 that cuts out the still image at a low rate and has been connected as the inputs of the processing nodes C2000 and C2200 is switched to the processing node C2400. As a result, the processing node C2100 that cuts out the still image at a low rate is deleted from the storage unit 5200 of the relay apparatus 5000 because there is no processing node and app that use an output of the processing node C2100. Thus, by promoting sharing of the processing node added during operation, stable and efficient operation of the relay apparatus is realized.

Thus, according to the present embodiment, in the relay apparatus, the processing node mediating a connection between the app and the device is inserted to realize loose coupling, and the processing node is operated efficiently, and thereby a relay apparatus and a relay method used for the relay apparatus can be provided by which an app can be flexibly connected to a device and various apps can be connected to various devices to realize stable operation. The embodiment has been described above, but the invention is not limited to the embodiment described above, and includes various modifications. For example, the embodiments described above have been described in detail for easy understanding of the invention, and the invention is not necessarily limited to those including all components described above.

What is claimed is:

1. A relay method for mediating a connection between an app and a device, the relay method comprising:

when an input specification of data required for an app whose use is to be started is input, comparing an output specification held by each processing node provided in an existing data processing path with a data item included in the input specification;

connecting an output of the data processing path to the app whose use is to be started if the existing processing node and the existing data processing path are able to satisfy the input specification;

adding a new processing node and comparing an output specification of the new processing node with the input specification if the existing data processing path is not able to satisfy the input specification; and connecting an output of the new processing node to the app whose use is to be started if the new processing node is able to satisfy the input specification;

wherein, during a determination of the new processing node to be added, a processing node is selected from those in which a number of appearances is higher than that of other processing nodes in order to specify a processing node that is expected to be used in the future.

2. The relay method according to claim 1, further comprising:

adding a new data processing path if the new processing node is not able to satisfy the input specification;

comparing an output specification held by a processing node provided in the new data processing path with the input specification; and connecting an output of the new data processing path to the app whose use is to be started if the processing node provided in the new data processing path is able to satisfy the input specification.

3. The relay method according to claim 2, further comprising:

determining that the device and the app whose use is to be started are not able to be connected and displaying a result if the processing node provided in the new data processing path is not able to satisfy the input specification.

4. The relay method according to claim 1, wherein in the comparing, the output specification held by the each processing node provided in the existing data processing path is compared with a frequency in addition to the data item included in the input specification.

5. A relay apparatus that mediates a connection between an app and a device, the relay apparatus comprising:

a processing device;

a storage device; and an input and output interface, wherein the processing device is configured to:

when an input specification of data required for an app whose use is to be started is input via the input and output interface, compare an output specification held by each processing node provided in an existing data processing path stored in the storage device with a data item included in the input specification, connect an output of the data processing path to the app whose use is to be started if the existing processing node and the existing data processing path are able to satisfy the input specification, add a new processing node and compare an output specification of the new processing node with the input specification if the existing data processing path is not able to satisfy the input specification, and connect an output of the new processing node to the app whose use is to be started if the new processing node is able to satisfy the input specification;

wherein, during a determination of the new processing node to be added, the processing device selects a processing node from those in which a number of appearances is higher than that of other processing nodes in order to specify a processing node that is expected to be used in the future.

6. The relay apparatus according to claim 5, wherein the processing device is configured to:

add a new data processing path via the input and output interface if the new processing node is not able to satisfy the input specification, compare an output specification held by a processing node provided in the new data processing path with the input specification, and connect an output of the new data processing path to the app whose use is to be started if the processing node provided in the new data processing path is able to satisfy the input specification.

7. The relay apparatus according to claim 6, wherein the processing device is configured to:

determine that the device and the app whose use is to be started are not able to be connected and display a result if the processing node provided in the new data processing path is not able to satisfy the input specification.

8. The relay apparatus according to claim 5, wherein the processing device is configured to:

as the comparison, compare the output specification held by the each processing node provided in the existing data processing path with a frequency in addition to the data item included in the input specification.

* * * * *